Jan. 3, 1939.   W. W. SLOANE   2,142,217
DRIVE MECHANISM FOR SHAKER CONVEYERS
Filed Jan. 6, 1936   3 Sheets-Sheet 1
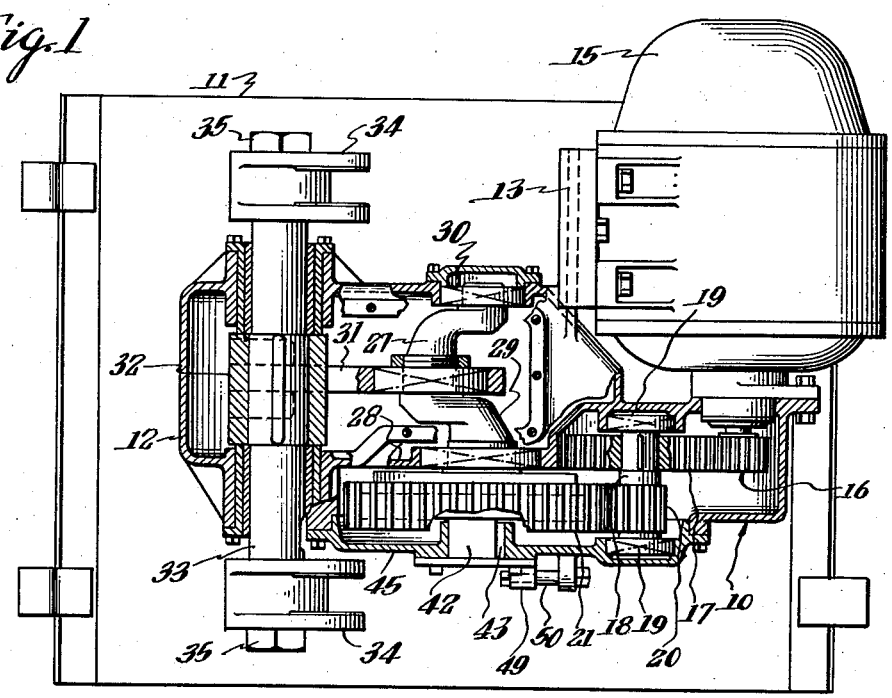
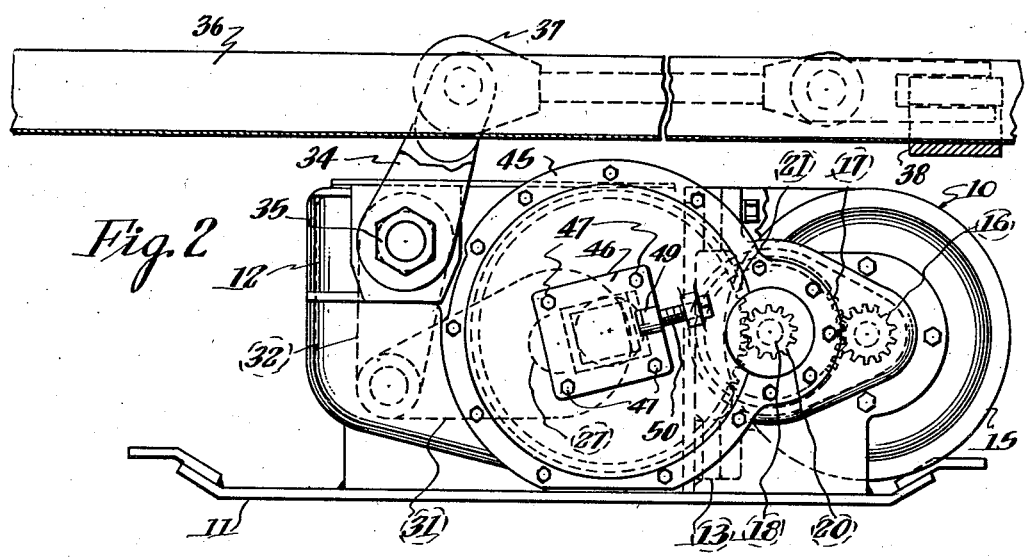
Inventor
William W. Sloane
Clarence F. Poole
Attorney Jan. 3, 1939.  W. W. SLOANE  2,142,217
DRIVE MECHANISM FOR SHAKER CONVEYERS
Filed Jan. 6, 1936   3 Sheets-Sheet 2

Inventor
William W. Sloane
Clarence F. Poole
Attorney

Jan. 3, 1939.  W. W. SLOANE  2,142,217
DRIVE MECHANISM FOR SHAKER CONVEYERS
Filed Jan. 6, 1936   3 Sheets-Sheet 3
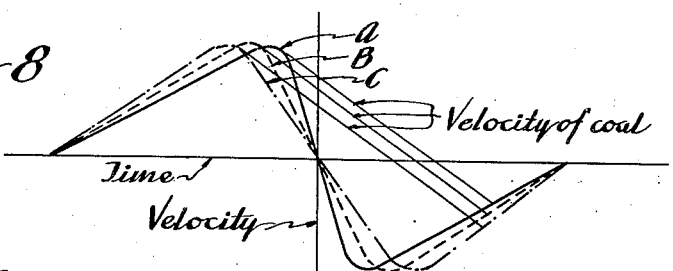
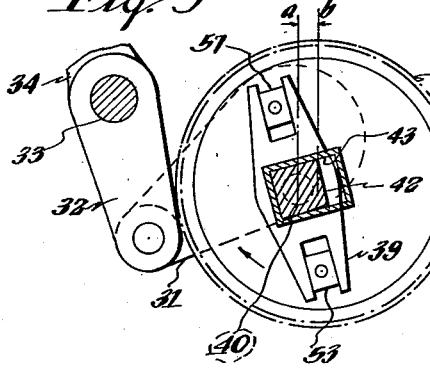
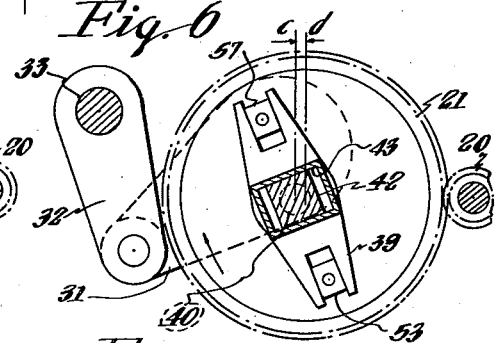
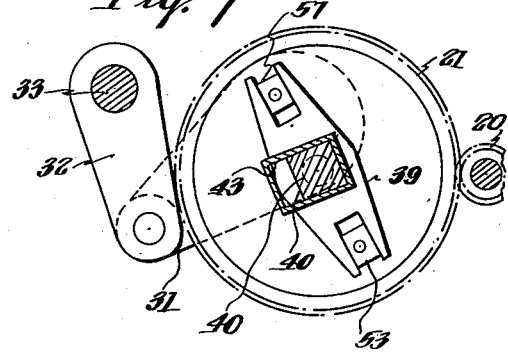
Inventor
William W. Sloane
Clarence F. Poole
Attorney Patented Jan. 3, 1939

2,142,217

UNITED STATES PATENT OFFICE 2,142,217

DRIVE MECHANISM FOR SHAKER CONVEYERS

William W. Sloane, Chicago, Ill., assignor to Goodman Manufacturing Company, Chicago, Ill., a corporation of Illinois Application January 6, 1936, Serial No. 57,730

9 Claims. (Cl. 198—220)

This invention relates to improvements in drive mechanisms for shaker conveyers of the type utilized for conveying loose material such as coal.

The most efficient shaker conveyer drive is one in which the acceleration of the forward stroke is uniform and is such as to bring the coal up to its maximum velocity as quickly as possible to the point where the forces cause the coal to slide; that is, the point of deceleration of the forward stroke. These ideal conditions, however, have been extremely difficult to even approximate by well-known mechanical methods including the use of rocking arms and drive members rotatably driven at variable angular velocities. Accordingly, the principal problem encountered in the design of a conveyer drive is that of introducing simple corrective factors in the drive to give the approximate ideal conditions hereinabove referred to without unduly increasing the size of the drive or stresses thereon, and to produce a drive which will move the most coal with the least stresses on the drive and conveyer trough line.

Heretofore, conveyer trough lines have been reciprocably driven by means of a rocking member rocked by a uniformly rotatable crank through a relatively short connecting rod in a manner similar to that illustrated by the Stroeder Patent No. 1,966,319. While this motion will satisfactorily move coal within certain limits, it has certain undesirable characteristics which cannot readily be eliminated without increasing the size of the drive to an impractical extent. These characteristics have been remedied to a large extent by constructing an entirely new drive on principles similar to those disclosed in my Patent No. 2,026,103, issued December 31, 1935. A drive so constructed, however, must be relatively large and the conveying effect of said drive cannot readily be changed to accommodate the drive to varying grades or lengths of trough lines.

Shaker conveyer trough lines have also been driven directly from a crank through a pitman, which crank is driven at a varying angular velocity in a manner similar to that disclosed in my application, Serial No. 706,787, filed January 15, 1934, which issued as Patent No. 2,077,811 on April 20, 1937. This motion may readily be varied to impart different intensities of conveying actions to the conveyer pan line and can be made to closely approximate these aforementioned ideal conditions for small drives, but has certain undesirable features when applied to large drives.

It has been found that a combination of two or more drive elements, each producing a slight difference in accelerating forces, will give a final motion wherein the difference between the accelerating forces approximates the sum of those obtained from each of the elements, and that the final motion will have a material moving ability which is superior in proportion to the maximum moving forces which might be attained from any single unit so proportioned as to give the same difference between the two average forces.

It has also been found that in shaker conveyer drives of moderate and large sizes, it is desirable that the trough line be driven by means of rocking arms connected to it by puller arms, rather than directly through a crank and pitman. The reason is that the puller arms can be placed parallel with the pan line and will vary from this relation but slightly throughout the stroke of the conveyer, while with the crank and pitman, the angle between the pitman and trough line varies considerably, causing the trough line to jump unless provisions are made to keep it in place. Accordingly, when a rocker arm is used for driving the trough line in a drive motion of the type utilizing a variably rotatable crank and pitman, the parts may be so proportioned that this rocker arm can furnish part of the drive action of the drive and thus make possible a drive having a superior material moving ability with little increase in size from the type of drive which consists simply in a uniformly rotatable crank which drives a rocking arm through a short connecting rod and gives a relatively poor velocity curve with heavy stresses on the drive. Thus, by combining a rocker arm with a variably rotatable crank and driving the rocker arm from the variably rotatable crank, a relatively small drive wherein the intensity of the drive action is capable of ready variation may be attained, which does not have the aforementioned undesirable characteristics present in each individual drive motion.

My invention, accordingly, has as its principal objects to provide a more efficient and compact shaker conveyer drive mechanism than formerly, by combining these two types of motions and driving an angularly movable member from a variably rotatable member, which drive mechanism is so arranged that the intensity of the drive action may readily be varied. Another object of my invention is to provide a compact and simplified arrangement of parts for effecting the above drive and provide a new and improved mechanism of a simplified construction for varying the angular velocity of the rotatable member which drives the angularly movable member.

My invention may be more clearly understood with reference to the accompanying drawings wherein:

Figure 1 is a top plan view of a shaker conveyer drive constructed in accordance with my invention with certain parts broken away and shown in horizontal section;

Figure 2 is a side elevation of the device shown in Figure 1 with the conveyer trough shown in substantially longitudinal section;

Figures 5, 6 and 7 are diagrammatic views illustrating various forms in which the motion varying mechanism may be arranged in order to vary the intensity of the drive action to the conveyer trough line; and Figure 8 is a diagram or graph showing certain hypothetical velocity curves of shaker motions attained by the mechanism illustrated in Figure 1.

Figure 3:
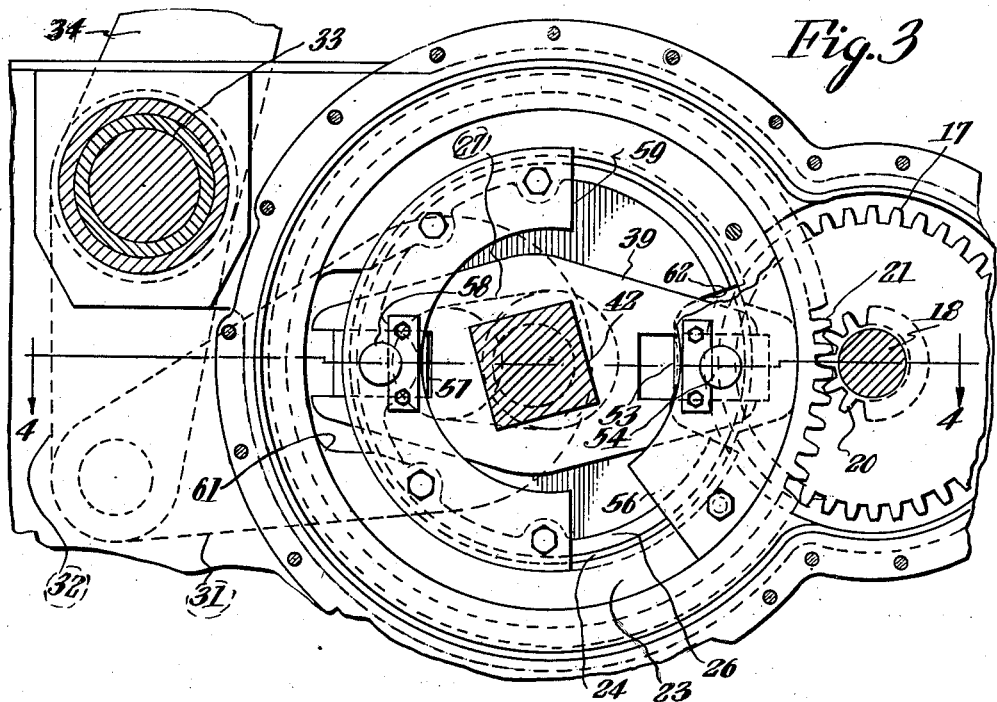
Figure 3 is an enlarged detail view of the mechanism for varying the angular velocity of the crank, with certain parts broken away and with certain other parts shown in vertical section.

In the drawings, the preferred embodiment of my invention illustrated is shown as comprising a shaker drive mechanism, indicated generally by reference character 10. Said drive mechanism is mounted on a base plate 11 adapted to be held in position on the mine floor in the usual manner, as by a plurality of jacks (not shown) adapted to be interposed between the mine roof and said base plate.

The drive mechanism 10 comprises a housing and support frame 12 mounted on the base plate 11 in a suitable manner. A portion of the outside of said housing is recessed adjacent one end thereof to receive a motor 15 which forms an actuating mechanism for the drive. A bracket 13 extends outwardly from said housing at the inner termination of said recessed portion. Said bracket forms a support means for said motor which is secured thereto and is also secured to an outer end of said housing so a portion of its frame adjacent the drive end of said motor may extend inwardly thereof.

The motor 15 is herein shown as being of an ordinary electrical construction and is provided with a motor pinion 16 disposed within said housing which meshes with and drives a spur gear 17 on a transversely extending shaft 18 mounted at its ends in opposite side walls of said housing in suitable anti-friction bearings 19, 19. A pinion 20 is keyed on said transverse shaft and meshes with and drives a spur gear 21, which is herein shown as being a ring gear.

The spur ring gear 21 has an inwardly extending annular flange 23 which has bearing engagement with the outer periphery of a ring 24 mounted on a shoulder 25 of a rotatable member 26. Said last-mentioned rotatable member forms a drive means for a crank 27 which is herein shown as being formed integral therewith. Said crank is mounted coaxial with the gear 21 and is journaled in an inner wall or partition 28 of said housing, adjacent said rotatable member on an anti-friction bearing member 29, and in an outer side wall of said housing on an anti-friction bearing member 30 (see Figures 1 and 4).

A relatively short connecting rod 31 is journaled on said crank and has pivotal connection with the lower end of a rocking arm 32. Said rocking arm is keyed on a transversely extending rocking shaft 33 journaled in said housing in suitable bearing members disposed adjacent opposite sides of said rocking arm. The conveyer trough line is actuated by means of suitable rocking arms 34, 34 keyed to the outer end of said rocking shaft and secured thereto by means of suitable nuts 35, 35. Said rocking arms have connection with a conveyer trough 36 of the conveyer pan line by means of suitable connecting or pusher rods 37, 37 having universal pivotal connection with a transversely extending connecting member 38 secured to the bottom of said conveyer trough and extending laterally from opposite sides thereof above the bottom thereof (see Figure 2).

With the arrangement just described, the crank 27 would rotate at a uniform angular velocity if directly driven from the gear 21, assuming the speed of the motor 15 to be constant. If said crank should be so driven, the angularity of the parts would be such that a conveyer trough line driven thereby would be reciprocably driven at such a variable acceleration as to cause material to move therealong, even though the velocity curve of the drive, which is used to measure the effectiveness of the drive, would be poor. As the angular velocity of said crank is corrected to vary at predetermined parts of its cycle of rotation, the velocity of the conveyer trough line will be varied, and as this variation in angular velocity of said crank from a uniform angular velocity is increased, the conveying effect thereof will be correspondingly increased.

It should be understood that if the motion of the crank 27 be corrected so as to be rotated at a predetermined variable angular velocity, in the manner which will hereinafter more clearly appear as this specification proceeds, and that if this crank should be connected directly to a conveyer trough line by means of a pitman, as in my aforementioned prior application, Serial No. 706,787, which is now Patent No. 2,077,811, that said crank would reciprocably drive said trough in such a manner as to move material therealong; the intensity of the conveying action imparted to said trough being determined by the extent of variation in the angular velocity of said crank from a uniform angular velocity.

An eccentric linkage arrangement is provided for correcting or varying the angular velocity of the crank 27, which comprises a cross-member 39 journaled on an inner end of a stub shaft 40 on an anti-friction bearing 41. Said stub shaft, as herein shown, has a rectangular outer portion 42 which is slidably mounted in a rectilinear guide 43. Said guide is formed in a cover 45 secured to the side wall of said housing disposed oppositely from said motor. Said rectangular portion of said shaft is herein shown as being provided with an integrally formed outer plate 46 which engages the outer side of said cover.

Said outer plate is adapted to be adjustably held in fixed relation with respect to said cover to provide a fixed bearing support for said cross-member by means of a plurality of cap screws 47, 47. Said cap screws extend through suitable parallel-spaced slots 48, 48 formed in said outer plate and are threaded within said cover.

The position of said stub shaft with respect to the ring gear 21 is adjusted by means of a lug 49 extending outwardly from said outer plate and having a machine screw 50 extending therethrough. Said machine screw is threaded within a lug 51 extending outwardly from said cover and the end of said screw opposite its head has a collar 52 secured thereto. Said collar abuts an outer side of said lug so that rotation of said machine screw in one direction will move said stub shaft along the rectilinear guide 43 when the cap screws 47, 47 are loosened from said outer plate.

Thus, said stub shaft may be shifted from a position coaxial with the center of rotation of the crank 27 and ring gear 21, as is diagrammatically shown in Figure 7, to an extreme position to one side of the center of rotation of said crank and ring gear, as is diagrammatically shown in Figure 5. This varies the eccentricity of said cross-member in an obvious manner. Relative movement of said cross-member with respect to said crank and gear during each cycle of rotation of said crank determines the variation of the angular velocity of said crank from a uniform angular velocity and determines the conveying effect of the trough line. This adjustable support for said stub shaft permits the conveying action of said trough line to be changed to conform to the required lengths and sizes of trough lines and effects a drive which will move material along the trough line in the most efficient manner commensurate with reasonable stresses on the drive and trough line.

Figure 4:
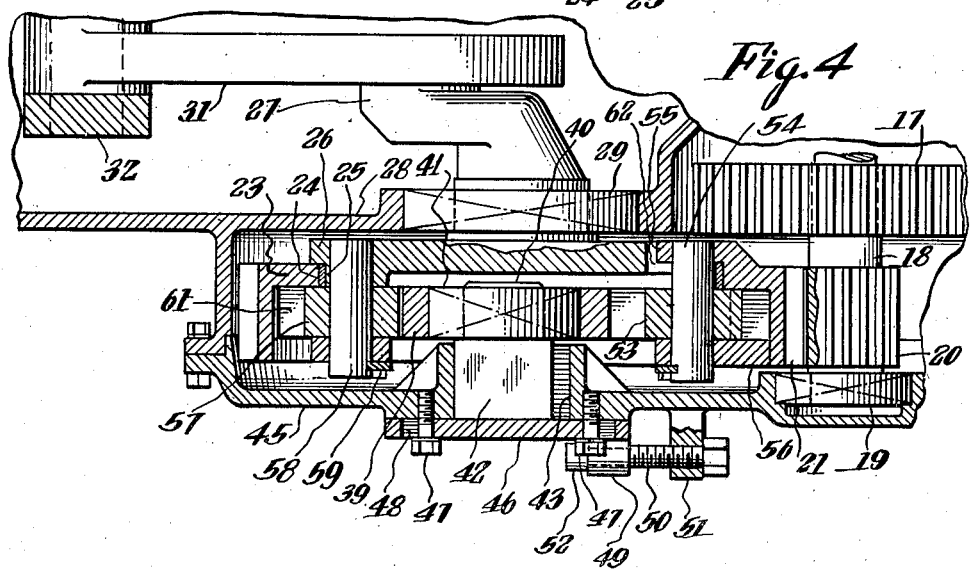
Figure 4 is a fragmentary sectional view taken substantially along line 4—4 of Figure 3.

The cross-member 39 is rotatably driven from the gear 21 by means of a block 53 which slidably engages a forked guide portion formed in one end of said cross-member (see Figures 3 and 4). Said block is pivotally mounted in the recess formed in said gear on a pin 54. Said pin is mounted at one of its ends in a lug 55 extending inwardly from the annular flange 23 and is mounted at its opposite end in a plate 56 secured to one side of said gear in a suitable manner, as is best shown in Figures 3 and 4.

The crank 27 is likewise driven from said cross-member by means of a block 57 which slidably engages a forked guide portion formed in the opposite end of said cross-member. Said block is pivotally mounted on a pin 58 which is mounted at one of its ends in the rotatable member 26 and at its opposite end in a plate 59 secured to said rotatable member by means of suitable cap screws (see Figure 3).

It should herein be noted that the ring gear 21 is provided with a recessed portion 61 adjacent the end of the cross-member 39 which is connected to the block 57 to allow for relative movement of said cross-member with respect to said ring gear. Likewise, the rotatable member 26 is cut away adjacent the lug 55, as is indicated by reference character 62, to accommodate said lug, and said ring gear is also recessed to conform to the end of said cross-member and permit movement of said cross-member with respect to said gear and the member 26.

It will be seen from the foregoing that the spur gear 21 may rotatably drive the cross-member 39 about an axis disposed eccentric of the center of rotation of said gear and that said cross-member may in turn drive the crank 27 about the axis of rotation of said gear. It will also be seen that the eccentricity of said cross-member and the amount of relative movement of said cross-member with respect to said gear and crank will vary the angular velocity of said crank during each revolution thereof, as has hereinbefore been explained.

In Figure 5, the stub shaft 40 is shown as positioned with its center in an extreme eccentric position with respect to the center of the gear 21, the amount of said eccentricity being indicated by the space between the lines $a$ and $b$. When said stub shaft is locked in such a position, relative movement between the cross-member 39 and the gear 21 and crank 27 will be at a maximum. Thus, the correction or variation in angular velocity of said crank for this arrangement will be at a maximum and the final drive will be such that the velocity curve of the conveyer trough will be substantially similar to that shown by curve A in Figure 8. This curve indicates that the acceleration of the conveyer trough line for the greater portion of its forward stroke is uniform and that the deceleration of the trough line is rapid at the latter portion of the forward stroke, which indicates a rapid reversal in the direction of travel of said trough line and results in a relatively high rate of coal travel. Such a drive action is suitable for efficiently conveying material at a relatively high rate of speed for a short distance along a relatively heavy pan line or a longer distance along a lighter pan line.

In Figure 6, the eccentricity of the center of the stub shaft 40 is shown as being less than in Figure 5, and is indicated by the space between lines $c$ and $d$. When the stub shaft 40 is so positioned, relative movement of said cross-member with respect to said gear and crank is decreased with a resultant decrease in the intensity of the drive action. In this position of said cross-member, the velocity curve of the conveyer trough line will be similar to that indicated by curve B in Figure 8. This curve indicates a less rapid rate of reversal of the pan line at the end of the forward stroke with a corresponding decrease in the maximum forces and a decrease in the stresses per unit of pan weight on the drive mechanism. Thus, when said cross-member is positioned as in Figure 6, the mechanism may safely be used for economically moving coal along a trough line of greater length or weight than the mechanism shown in Figure 5 with the same stresses per unit of pan weight on the drive mechanism.

In Figure 7, the center of the stub shaft 40 coincides with the center of the gear 21 and crank 27, with the result that said crank is driven at a uniform angular velocity. The angularity of the short connecting rod 31 and rocking member 32 vary the velocity of the trough line driven thereby, and the final velocity curve of the trough line, when the parts are so positioned, will be similar to that indicated by curve C in Figure 8. In this curve the accelerating rate has been increased a slight amount from curve B, but the rate of reversal of the pan line is less violent. Thus the stresses on the mechanism and pan line are correspondingly reduced so said mechanism may be effectively used for relatively long trough lines for effecting the maximum coal movement possible commensurate with reasonable stresses on the conveyer drive mechanism and trough.

It will be apparent from the foregoing, that the novel combination of two drive mechanisms and two principles of reciprocably driving a conveyer trough results in a more efficient and compact conveyer drive mechanism, wherein the drive action may readily be varied to take care of varying operating conditions.

It will also be seen that a new and improved means has been provided for varying the angular velocity of the crank which is of a simplified and efficient construction, permitting ready variation in the drive when desired.

While I have herein shown and described one form of my invention, I do not wish to be limited to the precise details of construction or arrangement of parts herein shown and described, excepting as specifically limited in the appended claims.

I claim as my invention:

1. In a shaker conveyer drive, a uniformly rotatable member, a crank coaxial therewith and driven thereby at a predetermined variable angular velocity, a rocking member, a connection from said rocking member to a conveyer trough for reciprocably driving said conveyer trough, a connection between said crank and rocking member for rocking said rocking member, and a linkage connection between said uniformly rotatable member and crank for driving said crank from said uniformly rotatable member at a variable angular velocity including a member rotatable about an axis eccentric of the axis of rotation of said crank and uniformly rotatable member.

2. In a shaker conveyer drive, a uniformly rotatable member, a crank coaxial therewith and driven thereby at a predetermined variable angular velocity, a rocking member, a connection from said rocking member to a conveyer trough for reciprocably driving said conveyer trough, a connection between said crank and rocking member for rocking said rocking member, and a linkage connection between said uniformly rotatable member and crank for driving said crank from said uniformly rotatable member at a variable angular velocity including a member rotatable about an axis eccentric of the axis of rotation of said crank and uniformly rotatable member, and having sliding engagement with said rotatable member and crank.

3. In a shaker conveyer operating mechanism and in combination with a reciprocably driven conveyer trough, means for driving said conveyer trough at a predetermined acceleration comprising a uniformly rotatable drive member, a rocking member, a connection between said rocking member and said conveyer trough, and a drive connection between said uniformly rotatable member and said rocking member for rocking said rocking member at a predetermined uniformly variable acceleration comprising a crank having a portion which forms a support for said uniformly rotatable member, a connection between said crank and uniformly rotatable member including a member rotatable about an axis eccentric of the axis of rotation of said crank for driving said crank from said uniformly rotatable member at a variable angular velocity, and a connecting rod connected between said crank and rocking member.

4. In a shaker conveyer operating mechanism and in combination with a reciprocably driven conveyer trough, means for driving said conveyer trough at a predetermined acceleration comprising a rocking member, a connection from said rocking member to said conveyer trough, a crank, a connecting link connecting said crank with said rocking member, and means for driving said crank at a predetermined variable angular velocity comprising a uniformly rotatable drive member, a member rotatable about an axis eccentric of the axes of rotation of said uniformly rotatable member and crank, a portion of said crank forming a support for said uniformly rotatable member and said crank being rotatably driven by said eccentrically disposed member at a variable angular velocity.

5. In a shaker conveyer operating mechanism and in combination with a reciprocably driven conveyer trough, a rotatable crank, a connection from said crank to said conveyer trough, and means for driving said crank at a variable angular velocity comprising a rotatable gear driven at a uniform angular velocity, said gear being disposed coaxially of said crank and mounted on a rotatable member rotatable with said crank for relative movement with respect thereto, a member mounted for rotation eccentric of the center of said gear, said last mentioned member having slidable engagement with said gear at one of its ends and with said crank at its opposite end for driving said crank from said gear.

6. In a shaker conveyer operating mechanism and in combination with a reciprocably driven conveyer trough, a rotatable crank, a connection from said crank to said conveyer trough, and means for driving said crank at a variable angular velocity comprising a rotatable gear driven at a uniform angular velocity, said gear being disposed coaxially of said crank and mounted on a rotatable member rotatable with said crank for relative movement with respect thereto, a member mounted for rotation eccentric of the center of said gear, said last mentioned member having slidable engagement with said gear at one of its ends and with said crank at its opposite end for driving said crank from said gear, and the eccentricity of said member being capable of being varied for varying the intensity of the conveying action of said conveyer trough.

7. In a shaker conveyer operating mechanism and in combination with a reciprocably driven conveyer trough, a rotatable crank, a connection from said crank to said conveyer trough, and means for driving said crank at a variable angular velocity comprising a rotatable gear driven at a uniform angular velocity, said gear being disposed coaxially of said crank and mounted on a rotatable member rotatable with said crank for relative movement with respect thereto, a member mounted for rotation eccentric of the center of said gear, a block pivoted to said gear and having slidable engagement with said last mentioned member, another block pivoted to said crank and having slidable engagement with said last mentioned member whereby said gear may drive said crank through said member, and the pivotal axes of said blocks and member being in alignment.

8. In a shaker conveyer drive, a reciprocably driven member comprising a conveyer trough, and means for driving said conveyer trough at a predetermined uniformly variable acceleration including a crank, a uniformly rotatable gear, and a connection between said gear and crank for driving said crank from said gear including a member rotatable about an axis disposed intermediate its ends, a slidable connection between one end of said member and said gear, and a slidable connection between the opposite end of said member and said crank, a rocking member, a connecting rod having connection with said rocking member for rocking said rocking member at a predetermined variable angular velocity, a connection from said rocking member to said conveyer trough, and a connection between said crank and connecting rod for reciprocably driving said rocking member from said crank and causing the conveying effect of said crank to be added to that of said rocking member.

9. In a shaker conveyer drive, a reciprocably driven member comprising a conveyer trough, and means for driving said conveyer trough at a predetermined uniformly variable acceleration including a crank, a uniformly rotatable gear and a connection between said gear and crank for driving said crank from said gear at a variable angular velocity including a member rotatable about an axis eccentric of the axes of rotation of said crank and gear, and a slidable driving connection between opposite ends of said member and said gear and crank, a rocking member, a connecting rod having connection with said rocking member for rocking said rocking member at a predetermined variable angular velocity, a connection from said rocking member to said conveyer trough, and a connection between said crank and connecting rod for driving said rocking member from said crank and causing the conveying effect of said crank to be added to that of said rocking member.

WILLIAM W. SLOANE.